(12) United States Patent
Leone et al.

(10) Patent No.: US 9,942,945 B2
(45) Date of Patent: Apr. 10, 2018

(54) OVERCURRENT PROTECTION ASSEMBLIES FOR APPLIANCES

(71) Applicant: General Electric Company, Schenectady, NY (US)

(72) Inventors: Davide Jonathan Leone, Louisville, KY (US); Joseph Emil Gormley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 307 days.

(21) Appl. No.: 15/002,768

(22) Filed: Jan. 21, 2016

(65) Prior Publication Data

US 2017/0214235 A1    Jul. 27, 2017

(51) Int. Cl.
| | |
|---|---|
| *H05B 1/02* | (2006.01) |
| *H02H 9/00* | (2006.01) |
| *H02H 9/02* | (2006.01) |
| H02H 3/08 | (2006.01) |
| H02H 7/20 | (2006.01) |

(52) U.S. Cl.
CPC ............. *H05B 1/0252* (2013.01); *H02H 9/00* (2013.01); *H02H 9/02* (2013.01); *H02H 3/08* (2013.01); *H02H 7/20* (2013.01)

(58) Field of Classification Search
CPC .. H02H 3/08; H02H 5/00; H02H 5/04–5/042; H02H 7/20; H02H 9/00; H02H 9/02; H05B 1/02; H05B 1/202; H05B 1/252–1/266
See application file for complete search history.

(56) References Cited

U.S. PATENT DOCUMENTS

| | | | | |
|---|---|---|---|---|
| 5,285,595 A | * | 2/1994 | Shirato | A01G 31/00 47/62 N |
| 5,955,795 A | * | 9/1999 | Beer | F24C 15/12 219/452.13 |
| 2010/0142104 A1 | * | 6/2010 | Cooper | H02H 3/32 361/49 |

* cited by examiner

*Primary Examiner* — Thienvu Tran
*Assistant Examiner* — Christropher Clark
(74) *Attorney, Agent, or Firm* — Dority & Manning, P.A.

(57) ABSTRACT

An overcurrent protection assembly for an appliance includes a cabinet configured to house the appliance, the cabinet including a body and a door, the door movable between an open position and a closed position. The overcurrent protection assembly further includes an overcurrent protection circuit, the overcurrent protection circuit including a switch and a current limiter. The switch is alternatable between an engaged position when the door is in the open position and a disengaged position when the door is in the closed position. The current limiter is in electrical communication with the switch when the switch is in the disengaged position and not in electrical communication with the switch when the switch is in the engaged position. Electricity flowing through the overcurrent protection circuit to the appliance flows at a high current level when the switch is in the engaged position and at a low current level when the switch is in the disengaged position.

20 Claims, 5 Drawing Sheets

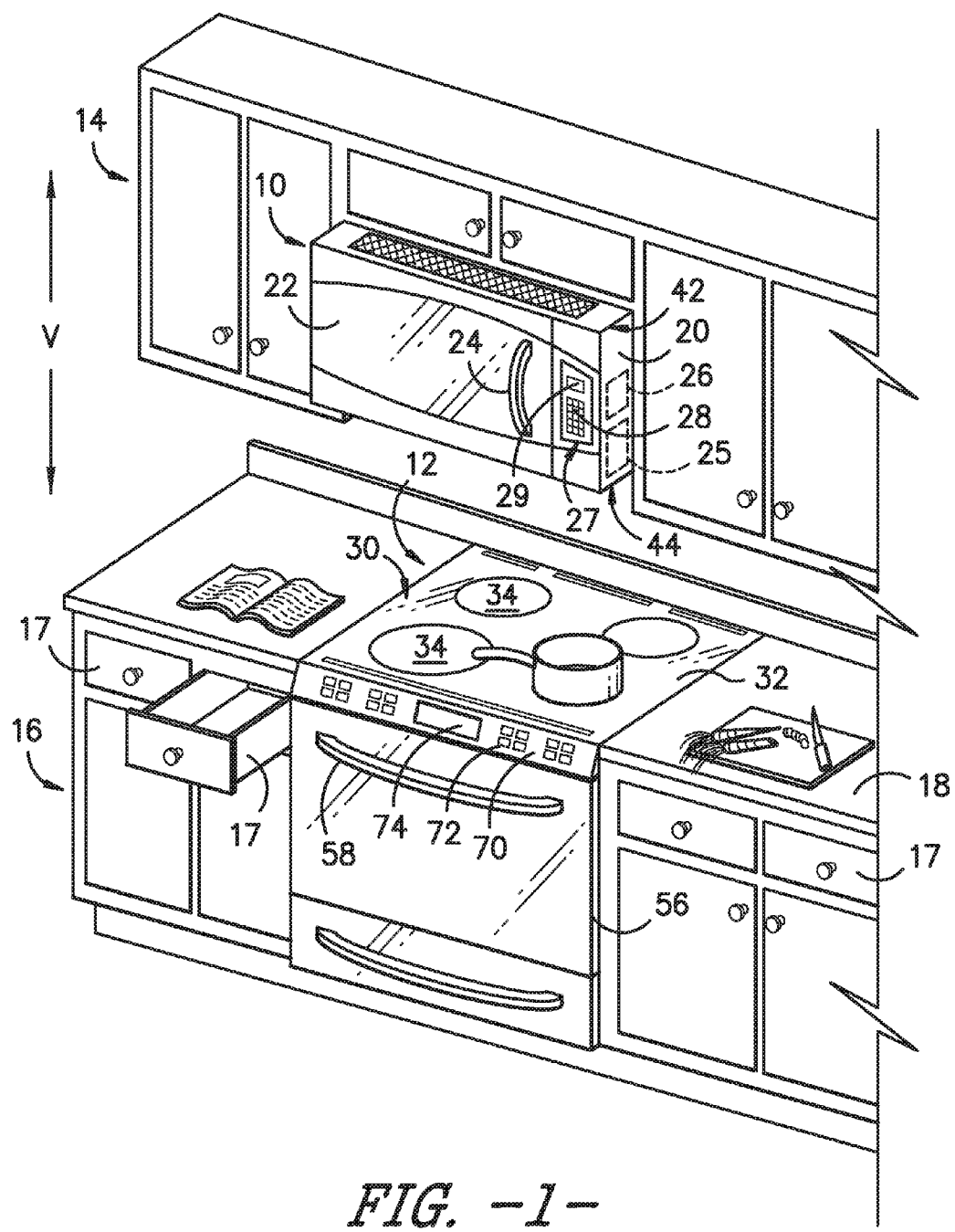
FIG. -1-

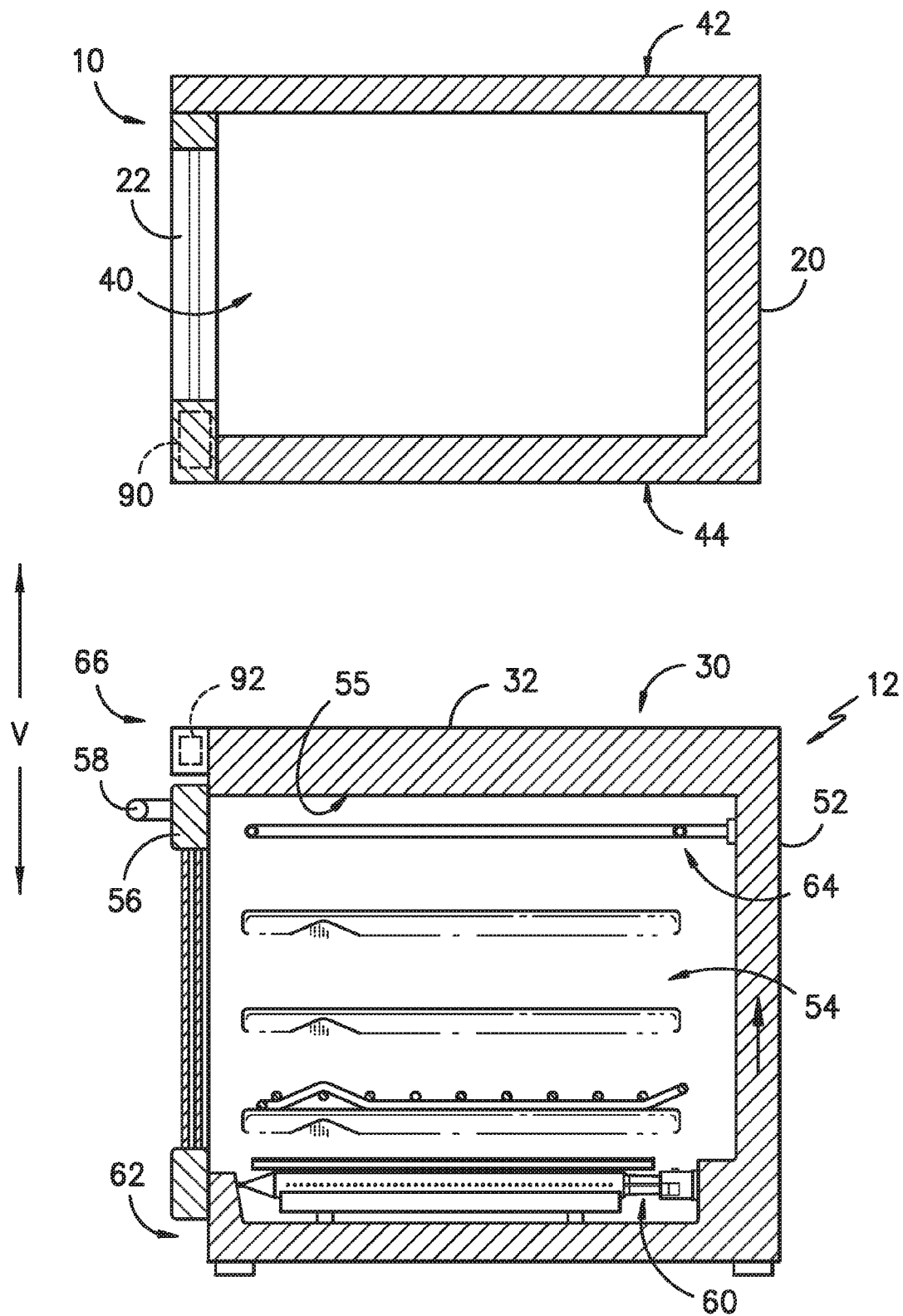
FIG. -2-

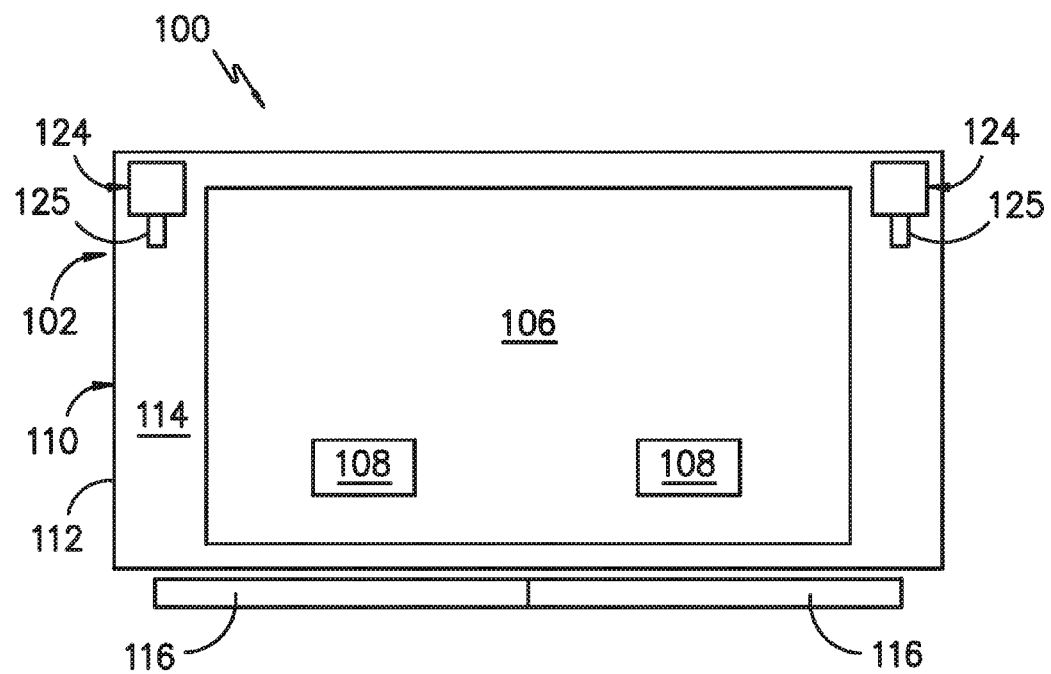
FIG. -3-
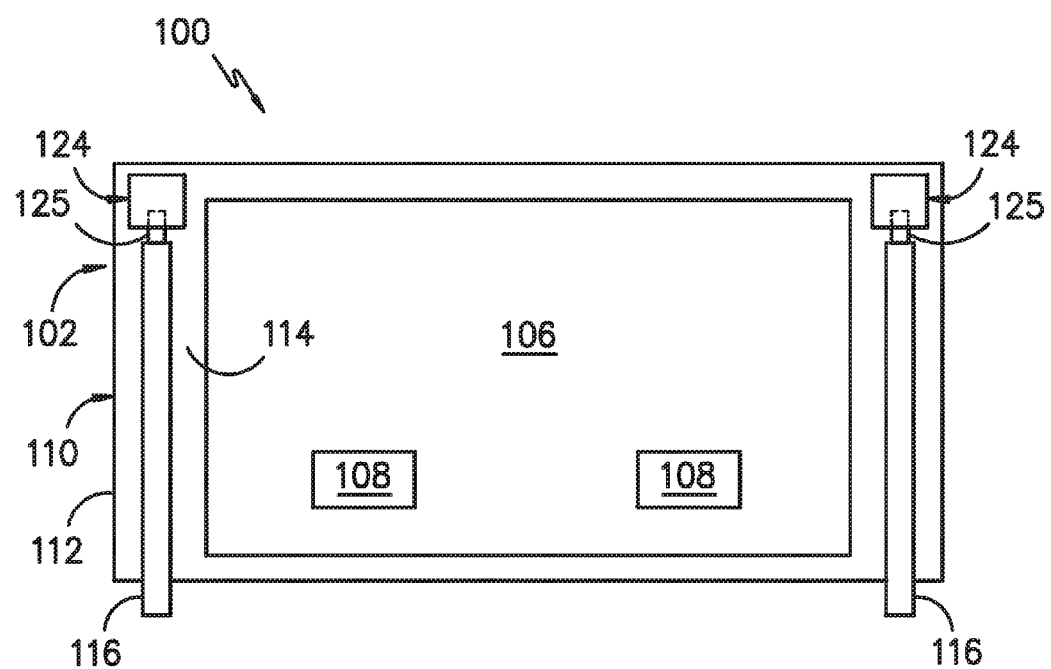
FIG. -4-

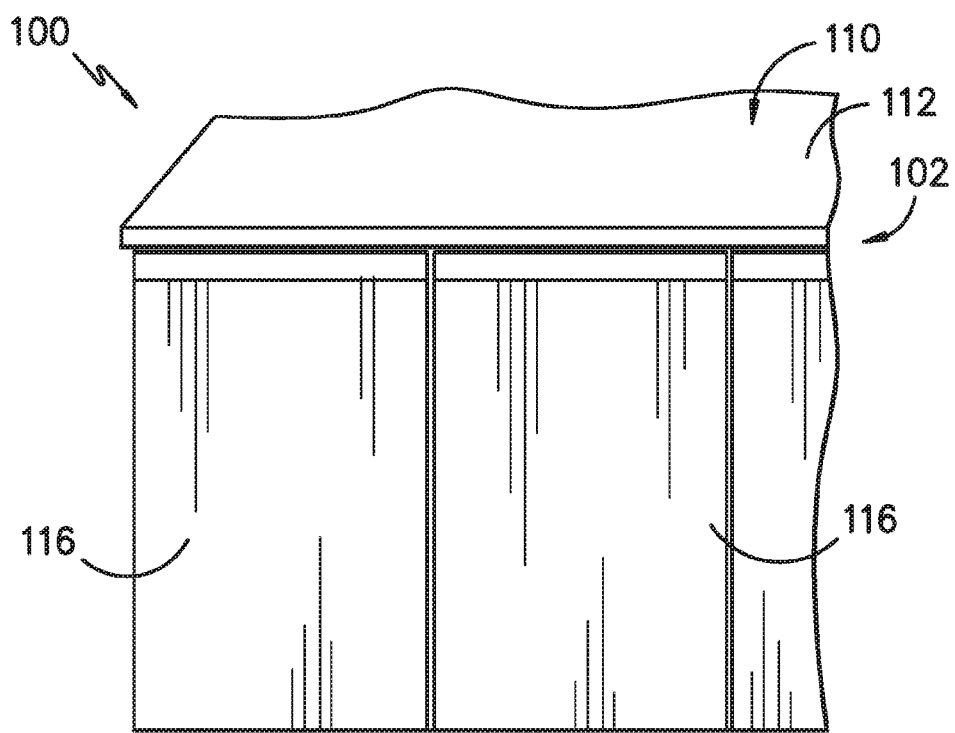
FIG. -5-
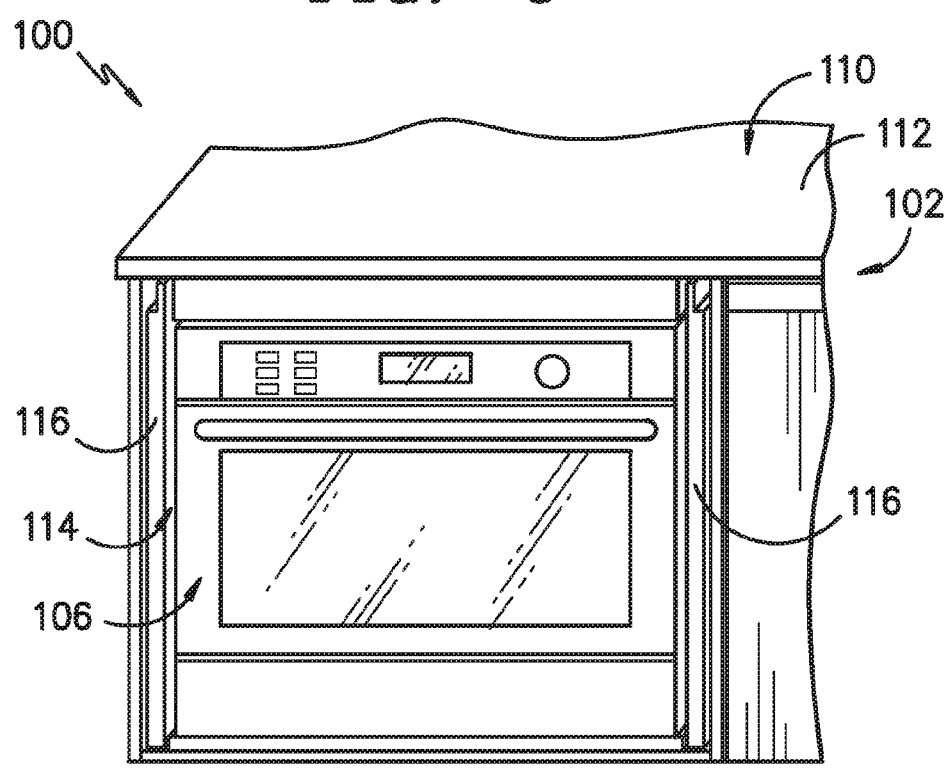
FIG. -6-

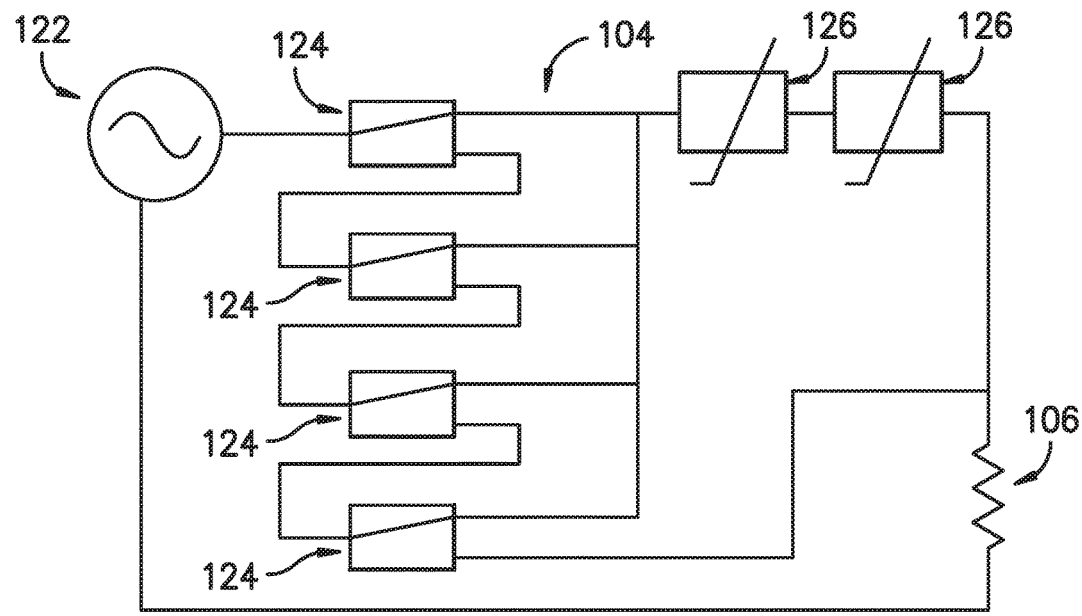
FIG. -7-
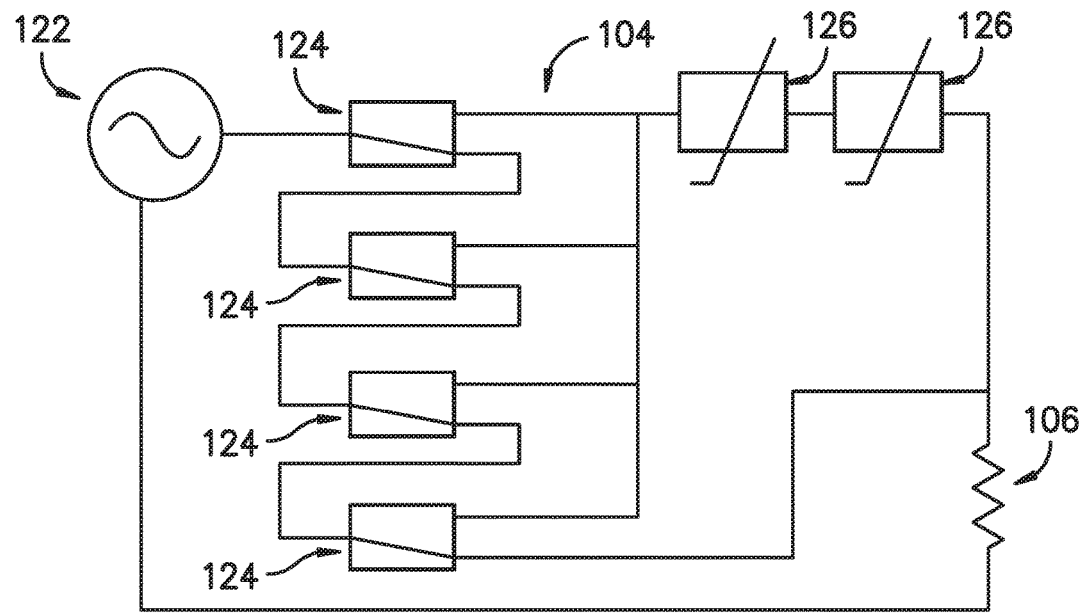
FIG. -8-

OVERCURRENT PROTECTION ASSEMBLIES FOR APPLIANCES

FIELD OF THE INVENTION

The present subject matter relates generally to appliances, and more particularly to overcurrent protection assemblies for use with appliances.

BACKGROUND OF THE INVENTION

Appliances are utilized in a variety of settings and for a variety of purposes. Many such appliances generate heat for various purposes, such for cooking purposes (i.e. range appliances, microwave appliances, toasters, toaster ovens, etc.), washing purposes (dishwashers, dryers, etc.).

For example, range appliances are frequently utilized in a variety of settings to cook food items. During operation of a range appliance, relatively high temperatures can be generated, for example, in the cooking chamber or on the cooktop of the range appliance. In many cases, the high temperatures generated by the range appliance can cause smoke or other exhaust fumes to emanate from the range appliance. Microwave appliances are similarly utilized in a variety of settings to cook food items, and relative high temperature can be generated within the interior of the microwave appliance.

In many cases, consumers may desire to hide or disguise certain appliances, in particular when the appliances are not being utilized. Such hiding or disguising may, for example, involve utilization of a cabinet to house the appliance. The consumer may open the door(s) of the cabinet to access the appliance, and close the doors when access is no longer necessary.

One risk when using cabinets in such manner is that the consumer may close the doors when the cabinet is actively operating in a manner in which significant heat is being generated, such as when cooking food items or performing washing functions. This can prevent proper ventilation for the appliance and cause appliance overheating, and can further increase the risk of fires, etc.

One solution to decrease this risk is to disconnect the appliance from its power source when the cabinet doors are closed. However, if the appliance is disconnected, the clock and other control features and settings on the appliance would have to be reset every time that the appliance was connected to a power source for use.

Accordingly, improved apparatus for reducing appliance overheating risks are desired in the art. In particular, apparatus which reduce appliance overheating risks while maintaining the appliance connection to its power source would be advantageous.

BRIEF DESCRIPTION OF THE INVENTION

In accordance with one embodiment, an overcurrent protection assembly for an appliance is provided. The overcurrent protection assembly includes a cabinet configured to house the appliance, the cabinet including a body and a door, the door movable between an open position and a closed position. The overcurrent protection assembly further includes an overcurrent protection circuit, the overcurrent protection circuit including a switch and a current limiter. The switch is alternatable between an engaged position when the door is in the open position and a disengaged position when the door is in the closed position. The current limiter is in electrical communication with the switch when the switch is in the disengaged position and not in electrical communication with the switch when the switch is in the engaged position. Electricity flowing through the overcurrent protection circuit to the appliance flows at a high current level when the switch is in the engaged position and at a low current level when the switch is in the disengaged position.

In accordance with another embodiment, an appliance assembly is provided. The appliance assembly includes an appliance, the appliance including an electrically-powered component, and a cabinet housing the appliance, the cabinet including a body and a door, the door movable between an open position and a closed position. The appliance assembly further includes an overcurrent protection circuit, the overcurrent protection circuit including a switch and a current limiter. The switch is alternatable between an engaged position when the door is in the open position and a disengaged position when the door is in the closed position. The current limiter is in electrical communication with the switch when the switch is in the disengaged position and not in electrical communication with the switch when the switch is in the engaged position. Electricity flowing through the overcurrent protection circuit to the appliance flows at a high current level when the switch is in the engaged position and at a low current level when the switch is in the disengaged position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of exemplary appliances in accordance with embodiments of the present disclosure;

FIG. 2 provides a side cross-sectional view of exemplary appliances in accordance with embodiments of the present disclosure;

FIG. 3 is a plan schematic view of an appliance assembly, with cabinet doors in closed positions, in accordance with embodiments of the present disclosure;

FIG. 4 is a plan schematic view of an appliance assembly, with cabinet doors in open positions, in accordance with embodiments of the present disclosure;

FIG. 5 is a front perspective view of an appliance assembly, with cabinet doors in closed positions, in accordance with embodiments of the present disclosure;

FIG. 6 is a front perspective view of an appliance assembly, with cabinet doors in open positions, in accordance with embodiments of the present disclosure;

FIG. 7 is an overcurrent protection circuit diagram, with switches of the circuit disengaged, in accordance with embodiments of the present disclosure; and FIG. 8 is an overcurrent protection circuit diagram, with switches of the circuit engaged, in accordance with embodiments of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a microwave appliance 10 according to an exemplary embodiment of the present subject matter mounted to an upper set of kitchen cabinets 14 above a range appliance 12, e.g., along a vertical direction V. Microwave appliance 10 shown in FIG. 1 is commonly referred to as an over-the-range microwave. It should be understood that, in alternative exemplary embodiments, the present subject matter may be used in any other suitable microwave appliance.

As discussed above, microwave appliance 10 is mounted to upper set of kitchen cabinets 14. Upper set of kitchen cabinets 14 is positioned above a base set of kitchen cabinets 16, e.g., along the vertical direction V. Base set of kitchen cabinets 16 includes countertops 18 and drawers 17. Microwave appliance 10 is positioned above base set of kitchen cabinets 16, e.g., along the vertical direction V. Range appliance 12 is received within base set of kitchen cabinets 16 below microwave appliance 10. In particular, a cooktop 30 of range appliance 12 is positioned, e.g., directly, below microwave appliance 10 along the vertical direction V.

Microwave appliance 10 is configured for receipt of food items for cooking. In particular, microwave appliance 10 includes a cabinet or casing 20 and a door 22 that permits selective access to an interior of microwave appliance 10 and casing 20. Door 22 includes a handle 24 that a user can pull to open door in order to insert food items into microwave appliance 10.

Microwave appliance 10 may further include various components which operation to produce electromagnetic radiation, as is generally understood. For example, microwave appliance 10 may include a magnetron 25 (such as, for example, a cavity magnetron), a high voltage transformer 26, a high voltage capacitor and a high voltage diode. The transformer 26 may provide energy from a suitable energy source (such as an electrical outlet) to the magnetron 25. The magnetron 25 may convert the energy to electromagnetic radiation, specifically microwave radiation. The capacitor generally connects the magnetron 25 and transformer 26, such as via high voltage diode, to a chassis such as the casing 20. Microwave radiation produced by the magnetron 25 may be transmitted through a waveguide to the cooking chamber 40.

Microwave appliance 10 may further include a user interface panel 27, which may as shown be located within convenient reach of a user of the microwave appliance 10. User interface panel 27 is generally a component that allows a user to interact with the microwave appliance 10 to, for example, activate various elements (such as transformer 26, magnetron 25, etc.), adjust power levels, set built-in timers, etc. A user interface panel 27 may include, for example, one or more user interface features 28 and a graphical display 29. The user interface features 28 may be, for example, buttons, knobs, touchscreen features, or any other suitable components that facilitate user interaction therewith. A user may interact with the user interface features to provide various commands to the microwave appliance 10. Graphical display 29 may generally deliver certain information to the user, which may be based on user selections and interaction with the user interface features 28, such as whether the transformer 26 and magnetron 25 are activated and/or the current power level, cooking time, etc. Graphical display 29 may also, for example, display the time of day and other various information.

FIG. 2 provides a side, sectional view of microwave appliance 10. As illustrated, casing 20 extends between a top portion 42 and a bottom portion 44, e.g., along the vertical direction V. Thus, top and bottom portions 42 and 44 of casing 20 are spaced apart from each other, e.g., along the vertical direction V. Casing 20 defines a cooking chamber 40 configured for receipt of food items for cooking. Door 22 of microwave appliance 10 permits selective access to cooking chamber 40 of casing 20. In particular, door 22 of microwave appliance 10 is selectively adjustable between an open position (not shown) and a closed position (FIGS. 1 and 2). In the closed position, door 22 of microwave appliance 10 hinders access to cooking chamber 40 of casing 20. Conversely, door 22 of microwave appliance 10 permits access to cooking chamber 40 of casing 20 in the open position. A user can pull on handle 24 of door 22 of microwave appliance 10 in order to shift door 22 from the closed position shown in FIG. 2 to the open position.

Still referring to FIG. 2, a side, sectional view of range appliance 12 is also provided. Range appliance 12 generally includes a cooking assembly. The cooking assembly may include one or more heating elements. For example, in some embodiments, the cooking assembly, and thus the range appliance 12 includes an insulated cabinet 52 with an interior cooking chamber 54 defined by an interior surface 55 of cabinet 52. Cooking chamber 54 is configured for the receipt of one or more food items to be cooked. Range appliance 12 includes a door 56 rotatably mounted to cabinet 52, e.g., with a hinge (not shown). A handle 58 is mounted to door 56 and assists a user with opening and closing door 56 in order to access cooking chamber 54. For example, a user can pull on handle 58 to open or close door 56 and access cooking chamber 54.

An electric bottom heating element 60 (e.g., a gas burner or a bake gas burner) is positioned in cabinet 52, e.g., at a bottom portion 62 of cabinet 12. Bottom heating element 60 is used to heat cooking chamber 54 for both cooking and cleaning of range appliance 12. The size and heat output of bottom heating element 60 can be selected based on the e.g., the size of range appliance 12.

A top heating element 64 is also positioned in cooking chamber 54 of cabinet 12, e.g., at a top portion 66 of cabinet 12. Top heating element 64 is used to heat cooking chamber 54 for both cooking/broiling and cleaning of range appliance 12. Like bottom heating element 60, the size and heat output of top heating element 64 can be selected based on the e.g., the size of range appliance 12. In the exemplary embodiment shown in FIG. 2, top heating element 64 is shown as an electric resistance heating element.

Referring again to FIG. 1, the range appliance 12 may additionally or alternatively include a cooktop 30. Cooktop 30 may be disposed on the cabinet 52. As show, cooktop 30 may include a top panel 32. By way of example, top panel 32 may be constructed of glass, ceramics, enameled steel, and combinations thereof. Heating assemblies 34, which in this embodiment are electric heating assemblies but in alternative embodiments may be gas burners or induction assemblies, may be mounted, for example, below the top panel 32. While shown with four heating assemblies 34 in the exemplary embodiment of FIG. 1, cooktop 30 may include any number of heating assemblies 34 in alternative exemplary embodiments. Heating assemblies 34 can also have various diameters. For example, each heating assembly of heating assemblies 34 can have a different diameter, the same diameter, or any suitable combination thereof.

Range appliance 12 may further include a user interface panel 70, which may as shown be located within convenient reach of a user of the range appliance 12. User interface panel 70 is generally a component that allows a user to interact with the range appliance 12 to, for example, turn various heating elements (such as heating elements 40, 42 and heating elements of heating assemblies 34) on and off, adjust the temperature of the heating elements, set built-in timers, etc. A user interface panel 70 may include, for example, one or more user interface features 72 and a graphical display 74. The user interface features 72 may be, for example, buttons, knobs, touchscreen features, or any other suitable components that facilitate user interaction therewith. A user may interact with the user interface features to provide various commands to the range appliance 12. Graphical display 74 may generally deliver certain information to the user, which may be based on user selections and interaction with the user interface features 72, such as whether a particular heating element is activated and/or the level at which the heating element is set. Graphical display 74 may also, for example, display the time of day and other various information.

As further illustrated in FIG. 2, controllers 90, 92 may be in communication with various components of the microwave appliance 10 and range appliance 12, respectively. Each controller 90, 92 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 90, 92 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User interface features 28, 72, graphical displays 29, 74, magnetron 25 and/or transformer 26, heating assembly 34, and heating elements 60, 64 may be in communication with the respective controllers 90, 92 via one or more signal lines or shared communication busses. It should be understood that such communication may be through any suitable wired or wireless connection. The controllers 90, 92 may generally be configured to control operations of the microwave appliance 10 and range appliance 12, respectively, such as based on user inputs to user interface features 28, 72. Accordingly, controllers 90, 92 may transmit signals to various components, such as graphical displays 29, 74, magnetron 25 and/or transformer 26, heating assembly 34, and heating elements 60, 64, to generally control operation of the microwave appliance 10 and range appliance 12, respectively. Such signals may include activation and deactivation signals, etc.

Referring now to FIGS. 3 through 8, embodiments of an appliance assembly 100, overcurrent protection assembly 102 and overcurrent protection circuit 104 in accordance with the present disclosure are illustrated. Appliance assembly 100 generally includes an appliance 106 which includes at least one electrically-powered component 108. Any suitable appliance is within the scope and spirit of the present disclosure. For example, appliance 106 may be a microwave appliance 10, range appliance 12, toaster, toaster oven, dishwasher, dryer, etc. Electrically-powered components include user interface features 28, 72, graphical displays 29, 74, magnetrons 25 and/or transformers 26, heating assemblies 34, heating elements 60, 64, controllers 90, 92, etc.

An appliance assembly 100 (and overcurrent protection assembly 102 thereof) may further include a cabinet 110 which is configured to house, and thus when utilized with an appliance 106 houses, the appliance 106. In some embodiments, for example, cabinet 110 may be upper cabinet 14 or lower cabinet 16 (or a portion thereof). Cabinet 110 may include a body 112 which defines an interior 114, and further includes one or more doors 116. The appliance 106 may be disposed within the interior 114. Body 112 may thus generally surround the appliance 106. Each door 116 may be movable (such slidable and/or rotatable) between a closed position (see FIGS. 3 and 5) and an open position (see FIGS. 4 and 6). When in the closed position, the doors 116 may prevent user access to the appliance 106, and in particular to a user interface panel 27, 70 thereof. When in the open position, the doors 116 may allow user access to the appliance 106, and in particular to a user interface panel 27, 70 thereof.

Appliance assembly 100 (and overcurrent protection assembly 102) may further include an overcurrent protection circuit 104. The overcurrent protection circuit 104 may advantageously selectively adjust the current level for electricity that flows from a power source 122 (i.e. an electrical power supply, such as via a wall outlet as is generally understood) to appliance 106 based on the position of the doors 116. Specifically, the overcurrent protection circuit 104 may adjust the current level to a high current level when the doors 116 are in open positions and a low current level when one or more doors 116 are in closed positions.

A high current level is a current level at which all normal operations of the appliance 106, in particular including operations which generate significant heat such as activation of heating elements 60, 64, heating assemblies 34, transformers 26 and magnetrons 25, etc., may be performed. A low current level is a current level at which particular operations, such as operations which generate significant heat, cannot be performed but appliance 106 maintenance operations, such as operation of the graphical display 29 to display, for example, the time of day and/or other information, may be performed. For example, a high current level may be above 2 amperes, such as above 5 amperes, such as above 10 amperes, such as above 13 amperes. A low current level may be between 50 milliamperes and 1.9 amperes, such as between 100 milliamperes and 1.5 amperes, such as between 500 milliamperes and 1 ampere.

Adjustment of the current level based on the position of the door 116 may advantageously reduce the risk of appliance 106 overheating while allowing the appliance 106 to continuously receive electricity from a power source 122. Reduction of the current level to the low current level when one or more doors is closed advantageously causes any significant heating activity being currently performed by the appliance 106 to be discontinued and prevents such activities from being performed. This reduces the risk of appliance 106 overheating when the door(s) 116 are closed and proper appliance 106 venting is reduced. However, when the current level is at the low current level, the appliance 106 still advantageously receives electrical power sufficient for appliance 106 maintenance operations. Accordingly, when the doors 116 are opened and the current level is increased to the high current level, resetting of the clock and other control features, settings, etc. is not required.

Overcurrent protection circuit 104 may include, for example, one or more switches 124 and one or more current limiters 126. Each switch 124 may be associated with a door 116, and in some embodiments may be selectively contactable by the door 116, such as when the door 116 is in an open position. Each switch 124 may be alternatable between an engaged position (see FIGS. 4 and 8) and a disengaged position (see FIGS. 3 and 7). In the engaged position, electricity is transmitted through and from the switch 124 along a particular path, which in the disengaged position, electricity is transmitted through and from the switch 124 along a different particular path. A switch 124 may, for example, be alternatable between the engaged position when the associated door 116 is in the open position (see FIG. 4) and the disengaged position when the associated door 116 is in the closed position (see FIG. 3). Further, in exemplary embodiments, a switch 124 may be alternatable between the engaged position when the door 116 is in the open position and in contact with the switch 124 and the disengaged position when the door is not in contact with the switch 124. Specifically, when a door 116 associated with a switch 124 is in the open position, the door 116 may contact the switch 124. Such contact by the door 116 may cause the switch 124 to alternate to the engaged position. When the door 116 is not in contact with the switch 124 (in an open position that is not fully open, in a position between open and closed, or in a closed position) the switch 124 may alternate to the disengaged position.

In exemplary embodiments, a switch 124 may be a snap-action switch and may thus include a mechanical plunger or actuator 125. Contact by the door 116 with the actuator 125 may cause the switch 124 to alternate to the engaged position. Lack of contact by the door 116 with the actuator 125 may cause the switch 124 to alternate to the disengaged position. Alternatively, any other suitable switch 124 may be utilized. Notably, contact between the door 116 and switch 124 is not required in accordance with the present disclosure. For example, switch 124 may be a proximity sensor or other suitable device which can alternate between the engaged and disengaged positions based on sensing the position of the associated door 116 without necessarily physically contacting the door 116.

Current limiter(s) 126 may be in electrical communication with the switch(es) 124 when the switch(es) 124 is in the disengaged position and not in electrical communication with the switch(es) 124 when the switch(es) 124 is in the engaged position. For example and as illustrated, when any switch 124 of the circuit 104 is disengaged, electricity flows through the circuit 104 along a path through the current limiter(s) 126. The current limiter(s) 126 limit the current level therethrough, reducing the current level to the low current level. This low current level is then provided to the appliance 106. When all switches 124 of the circuit are engaged, electricity flows through the circuit 104 along a path that does not include the current limiter(s) 126. Accordingly, the current level is not reduced, and rather is provided through the circuit 104 and to appliance 106 at the high current level.

In exemplary embodiments, a current limiter 126 is a polymeric positive temperature coefficient device (also known as a resettable fuse, polyfuse or polyswitch). Alternatively, other suitable electrical components or combinations of electrical components, such as resistors, relays, other suitable fuses, etc., may be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance assembly, comprising:
   an appliance, the appliance comprising an electrically-powered component;
   a cabinet housing the appliance, the cabinet comprising a body and a door, the door movable between an open position and a closed position;
   an overcurrent protection circuit, the overcurrent protection circuit comprising:
      a switch, the switch alternatable between an engaged position when the door is in the open position and a disengaged position when the door is in the closed position; and
      a current limiter, the current limiter in electrical communication with the switch when the switch is in the disengaged position and not in electrical communication with the switch when the switch is in the engaged position,
   wherein electricity flowing through the overcurrent protection circuit to the appliance flows at a high current level when the switch is in the engaged position and at a low current level when the switch is in the disengaged position.

2. The appliance assembly of claim 1, wherein the switch is alternatable between the engaged position when the door is in the open position and in contact with the switch and the disengaged position when the door is not in contact with the switch.

3. The appliance assembly of claim 1, wherein the current limiter is a polymeric positive temperature coefficient device.

4. The appliance assembly of claim 1, wherein the switch is a snap-action switch.

5. The appliance assembly of claim 1, wherein the high current level is above 2 amperes and the low current level is between 50 milliamperes and 1.9 amperes.

6. The appliance assembly of claim 1, wherein the high current level is above 5 amperes and the low current level is between 100 milliamperes and 1.5 amperes.

7. The appliance assembly of claim 1, wherein the high current level is above 10 amperes and the low current level is between 500 milliamperes and 1 ampere.

8. The appliance assembly of claim 1, wherein the door is a plurality of doors.

9. The appliance assembly of claim 8, wherein the switch is a plurality of switches, and wherein each of the plurality of switches is contactable by one of the plurality of doors.

10. The appliance assembly of claim 1, wherein the current limiter is a plurality of current limiters.

11. An overcurrent protection assembly for an appliance, the overcurrent protection assembly comprising:
    a cabinet configured to house the appliance, the cabinet comprising a body and a door, the door movable between an open position and a closed position;

an overcurrent protection circuit, the overcurrent protection circuit comprising:
- a switch, the switch alternatable between an engaged position when the door is in the open position and a disengaged position when the door is in the closed position; and
- a current limiter, the current limiter in electrical communication with the switch when the switch is in the disengaged position and not in electrical communication with the switch when the switch is in the engaged position, wherein electricity flowing through the overcurrent protection circuit to the appliance flows at a high current level when the switch is in the engaged position and at a low current level when the switch is in the disengaged position.

12. The overcurrent protection assembly of claim 11, wherein the switch is alternatable between the engaged position when the door is in the open position and in contact with the switch and the disengaged position when the door is not in contact with the switch.

13. The overcurrent protection assembly of claim 11, wherein the current limiter is a polymeric positive temperature coefficient device.

14. The overcurrent protection assembly of claim 11, wherein the switch is a snap-action switch.

15. The overcurrent protection assembly of claim 11, wherein the high current level is above 2 amperes and the low current level is between 50 milliamperes and 1.9 amperes.

16. The overcurrent protection assembly of claim 11, wherein the high current level is above 5 amperes and the low current level is between 100 milliamperes and 1.5 amperes.

17. The overcurrent protection assembly of claim 11, wherein the high current level is above 10 amperes and the low current level is between 500 milliamperes and 1 ampere.

18. The overcurrent protection assembly of claim 11, wherein the door is a plurality of doors.

19. The overcurrent protection assembly of claim 18, wherein the switch is a plurality of switches, and wherein each of the plurality of switches is contactable by one of the plurality of doors.

20. The overcurrent protection assembly of claim 11, wherein the current limiter is a plurality of current limiters.

* * * * *